United States Patent
Lin et al.

(10) Patent No.: US 9,635,498 B2
(45) Date of Patent: Apr. 25, 2017

(54) METHODS AND APPARATUSES FOR INDOOR POSITIONING

(71) Applicant: Quanta Computer Inc., Taoyuan (TW)

(72) Inventors: I-Chin Lin, Taoyuan (TW); Chang-En Tsai, Taoyuan (TW)

(73) Assignee: QUANTA COMPUTER INC., Guishan Dist., Taoyuan (TW)

(*) Notice: Subject to any disclaimer, the term of this patent is extended or adjusted under 35 U.S.C. 154(b) by 0 days.

(21) Appl. No.: 14/873,755

(22) Filed: Oct. 2, 2015

(65) Prior Publication Data
US 2016/0360342 A1    Dec. 8, 2016

(30) Foreign Application Priority Data
Jun. 4, 2015    (TW) .................................. 104118084

(51) Int. Cl.
*H04W 4/00* (2009.01)
*H04W 4/06* (2009.01)
*H04W 4/04* (2009.01)
*H04W 64/00* (2009.01)
*H04W 8/00* (2009.01)

(52) U.S. Cl.
CPC ............ *H04W 4/008* (2013.01); *H04W 4/04* (2013.01); *H04W 4/06* (2013.01); *H04W 64/00* (2013.01); *H04W 8/005* (2013.01)

(58) Field of Classification Search
CPC ....... H04W 64/00; H04W 4/04; H04W 16/26; H04W 88/08; H04W 88/10; H04W 4/00; H04W 8/00; H04W 52/0209; H04B 17/12; H04B 17/24; H04B 17/21; H04B 17/17

See application file for complete search history.

(56) References Cited

U.S. PATENT DOCUMENTS

| 7,852,804 | B2 | 12/2010 | Tien | |
| 2009/0003273 | A1* | 1/2009 | Tien | ...................... H04W 16/26 370/329 |
| 2015/0382304 | A1* | 12/2015 | Park | ...................... H04W 4/008 455/41.2 |
| 2016/0100276 | A1* | 4/2016 | Viswanadham | ...... H04W 8/005 455/41.2 |

FOREIGN PATENT DOCUMENTS

| CN | 102645666 | 8/2012 |
| CN | 103995251 | 8/2014 |
| TW | 200901791 | 1/2009 |

OTHER PUBLICATIONS

Chinese language office action dated Apr. 11, 2015, issued in application No. TW 104118084.

* cited by examiner

*Primary Examiner* — Thanh Le
(74) *Attorney, Agent, or Firm* — McClure, Qualey & Rodack, LLP (57) ABSTRACT

The invention introduces an apparatus for indoor positioning, which contains at least a communications interface and a processing unit. The processing unit, coupled to the communications interface, sets the apparatus to a connection-disallowed state when an indoor positioning is activated, and broadcasts an advertising message periodically in an advertising state via the communications interface, where the advertising message contains at least the identity of the apparatus, a timestamp at which the advertising message is sent, and the transmission power.

20 Claims, 6 Drawing Sheets

METHODS AND APPARATUSES FOR INDOOR POSITIONING

CROSS REFERENCE TO RELATED APPLICATIONS

This Application claims priority of Taiwan Patent Application No. 104118084, filed on Jun. 4, 2015, the entirety of which is incorporated by reference herein.

BACKGROUND

Technical Field

The present invention relates to a positioning technology, and in particular, to methods and apparatuses for indoor positioning.

Description of the Related Art

Conventional GPS (Global Positioning System) or AGPS (Assisted Global Positioning System) calculates position by tracking satellite signals. However, satellite signals are easily blocked by buildings and position is difficult to track indoors. Thus, it is desirable to have methods and apparatuses for indoor positioning to address the aforementioned problem.

BRIEF SUMMARY

An embodiment of the invention introduces an apparatus for indoor positioning, which contains at least a communications interface and a processing unit. The processing unit, coupled to the communications interface, sets the apparatus to a connection-disallowed state when an indoor positioning is activated, and broadcasts an advertising message periodically in an advertising state via the communications interface, which contains at least the identity of the apparatus, a timestamp at which the advertising message is sent, and the transmission power.

Another embodiment of the invention introduces an apparatus for indoor positioning, which contains at least a communications interface and a processing unit. The processing unit, coupled to the communications interface, obtains the transmission power of an advertising message from an advertiser in a scanning state via the communications interface; calculates the reception strength for receiving the advertising message; calculates a decay magnitude according to the transmission power and the reception strength; determines the distance between the apparatus and the advertiser according to the decay magnitude; and sends positioning information corresponding to the advertiser to a positioning server, which contains at least a first location of the apparatus, the identity of the advertiser, a timestamp at which the advertising message is sent, and the distance, thereby enabling the positioning server to calculate a second location of the advertiser according to the positioning information.

An embodiment of the invention introduces a method for indoor positioning, executed by the processing unit of an advertiser, which contains at least the following steps. The advertiser is set to a connection-disallowed state when an indoor positioning is activated. An advertising message is broadcast periodically in an advertising state, which contains at least the identity of the advertiser, a timestamp at which the advertising message is sent, and the transmission power Another embodiment of the invention introduces a method for indoor positioning, executed by a processing unit of an advertiser, which contains at least the following steps. A transmission power of an advertising message is obtained from an advertiser in a scanning state. The reception strength for receiving the advertising message is calculated and a decay magnitude is calculated according to the transmission power and the reception strength. The distance between the apparatus and the advertiser is determined according to the decay magnitude. Positioning information corresponding to the advertiser is sent to a positioning server, which contains at least a first location of the scanner, the identity of the advertiser, a timestamp at which the advertising message is sent, and the distance, thereby enabling the positioning server to calculate a second location of the advertiser according to the positioning information.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
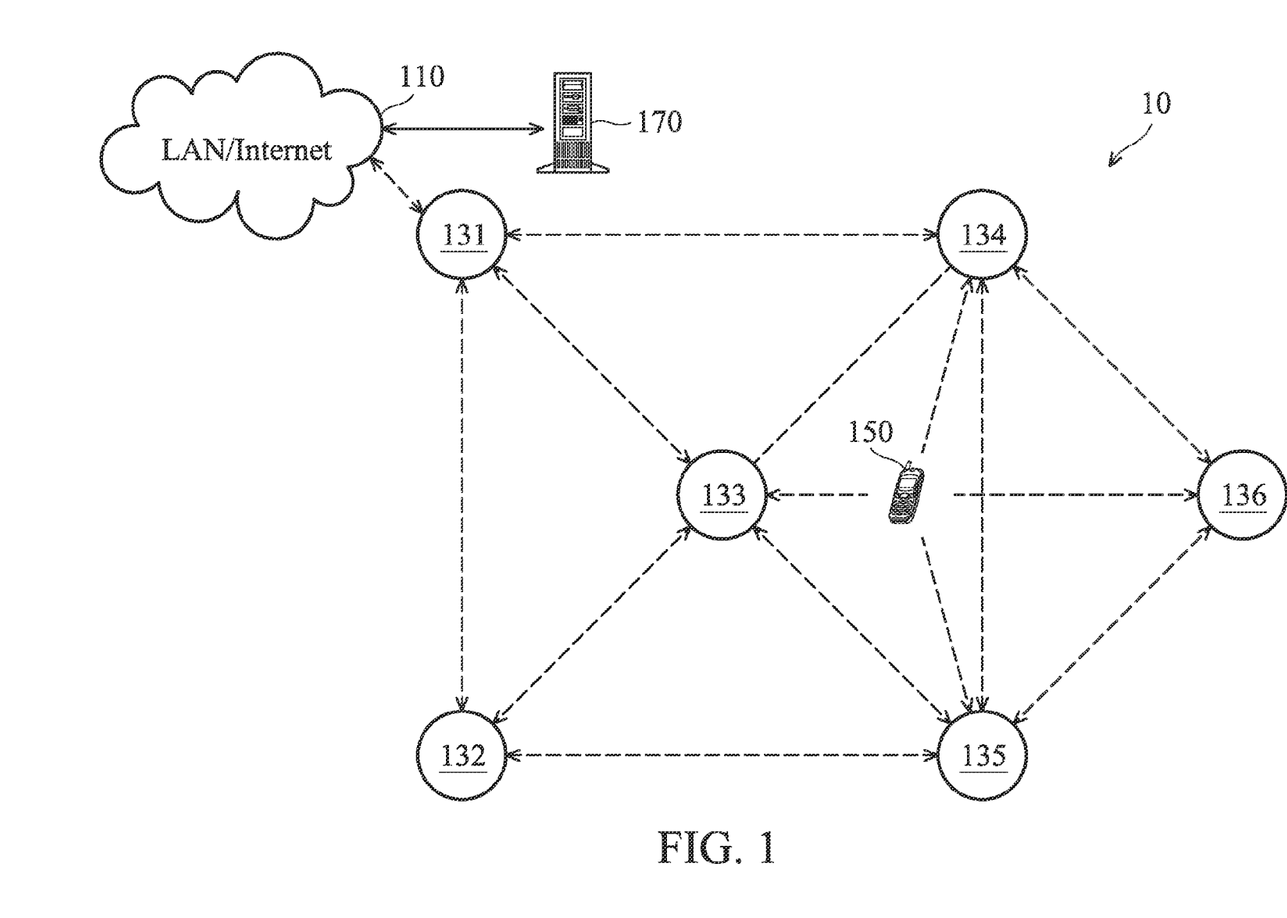
FIG. 1 is the network architecture of an indoor positioning system according to an embodiment of the invention.

FIG. 1 is the network architecture of an indoor positioning system according to an embodiment of the invention. For example, since six Bluetooth nodes 131 to 136 are equipped in a three-dimensional space, a user carrying a mobile apparatus 150 may know his current position with the help of the Bluetooth nodes 131 to 136 when wandering around a three-dimensional space. The mobile apparatus 150 may be a mobile phone, a tablet computer, a notebook computer, a smartwatch, etc. Bluetooth nodes 131 to 136 form a mesh network and each may communicate with a neighboring node. Any of the Bluetooth nodes 131 to 136 may operate as a repeater, whereby data may be passed from one to another which is not directly connected. For example, the Bluetooth node 136 cannot connect directly to the Bluetooth node 133 because of distance or power limitations, but it can pass the information through the Bluetooth nodes 134 or 135. The mobile apparatus 150 may broadcast advertising messages repeatedly using a specific communications protocol (for example, Bluetooth 4.0), each of which includes information regarding an identifier of the mobile apparatus 150, a timestamp, a Tx (transmission) power, etc. Any of the Bluetooth nodes 131 to 136 may obtain an advertising message broadcast by the mobile apparatus 150, calculate the reception strength of the advertising message, determine a decay magnitude according to the Tx power of the advertising message and the calculated reception strength, and calculate the distance to the mobile apparatus 150 according to the decay magnitude. Any of the Bluetooth nodes 131 to 136 may further transmit positioning information, such as three-dimensional coordinates of itself, the identifier of the mobile apparatus 150, the timestamp of the advertising message, the calculated distance, etc., to a positioning server 170 via one or more Bluetooth nodes, a LAN (Local Area Network), the Internet, or any combination thereof. The positioning server 170 continuously collects positioning information reported by the Bluetooth nodes 131 to 136 and updates the three-dimensional position of the mobile apparatus 150 using a multi-angle positioning method.

Figure 2:
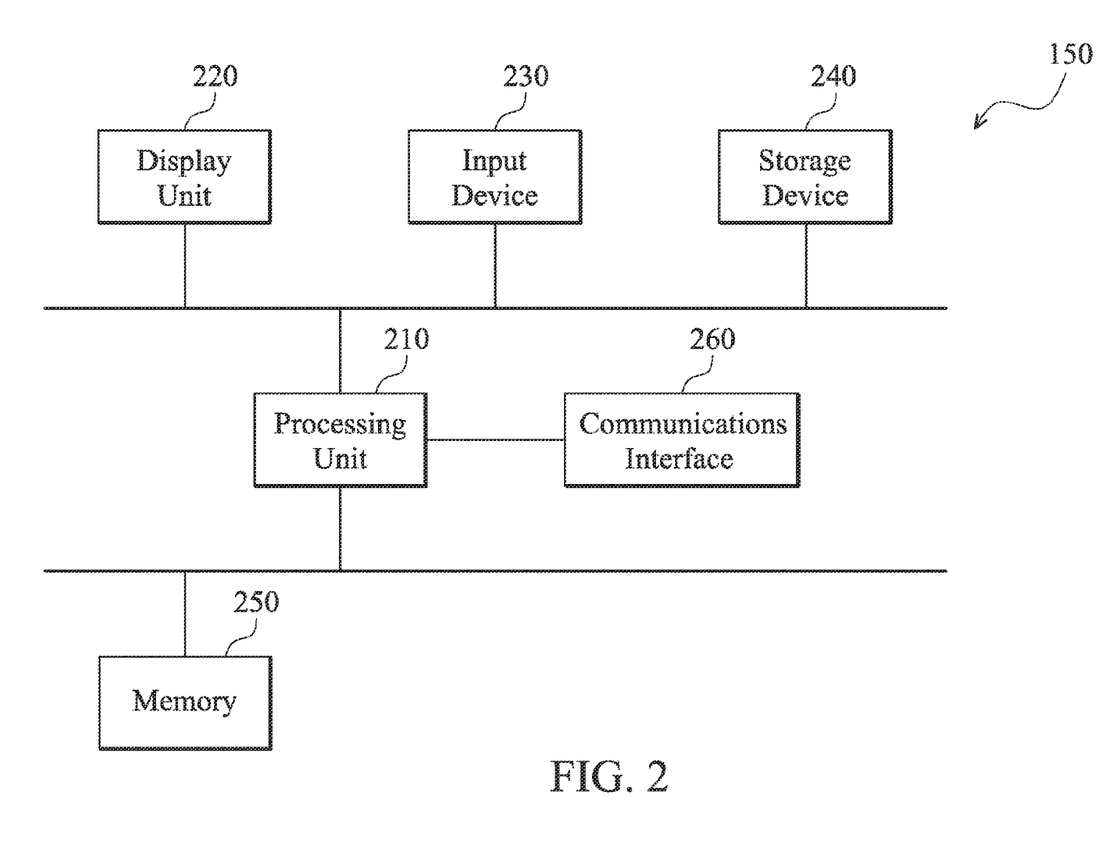
FIG. 2 is the system architecture of a computer apparatus according to an embodiment of the invention.

FIG. 2 is the system architecture of a computer apparatus according to an embodiment of the invention. The system architecture may be practiced in the mobile apparatus 150 or the positioning server 170, at least including a processing unit 210. The processing unit 210 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The system architecture further includes a memory 250 for storing necessary data in execution, such as variables, data tables, or others, and a storage device 240 for storing a wide range of electronic files, such as Web pages, documents, video files, audio files, and others. A communications interface 260 is included in the system architecture and the processing unit 210 can thereby communicate with the Bluetooth nodes 131 to 136 or other electronic apparatuses. The communications interface 260 may be a Bluetooth module with a low-cost and a low-battery-power-consumption. The system architecture further includes one or more input devices 230 to receive user input, such as a keyboard, a mouse, a touch panel, or others. A user may press hard keys on the keyboard to input characters, control a mouse pointer on a display by operating the mouse, or control an executed application with one or more gestures made on the touch panel. The gestures include, but are not limited to, a single-click, a double-click, a single-finger drag, and a multi-finger drag. A display unit 220, such as a TFT-LCD (Thin film transistor liquid-crystal display) panel, an OLED (Organic Light-Emitting Diode) panel, or another display unit, may also be included to display input letters, alphanumeric characters and symbols, dragged paths, drawings, or screens provided by an application for the user to view.

Figure 3:
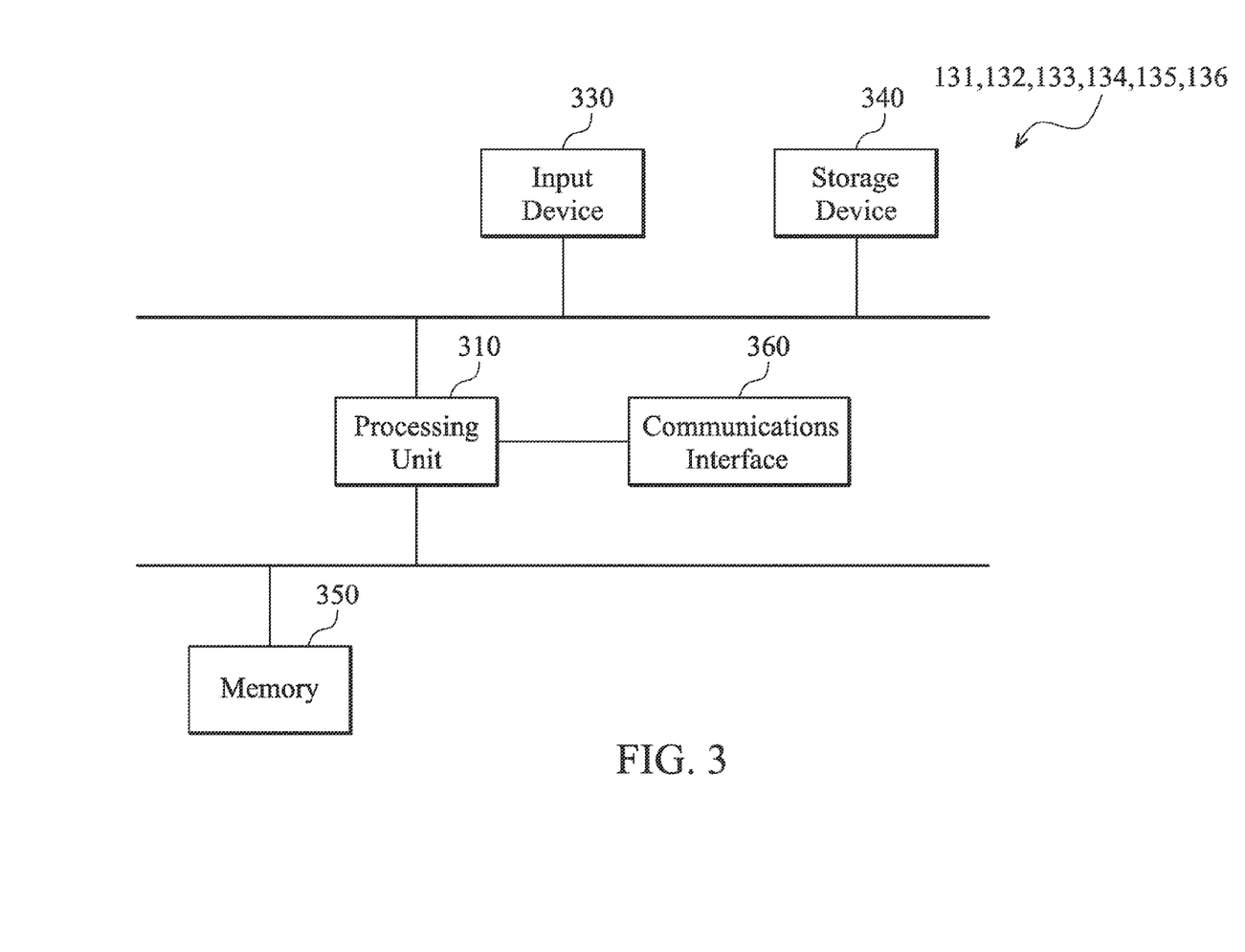
FIG. 3 is the system architecture of a computer apparatus according to an embodiment of the invention.

FIG. 3 is the system architecture of a computer apparatus according to an embodiment of the invention. The system architecture may be practiced in each of the Bluetooth nodes 131 to 136, at least including a processing unit 310. The processing unit 310 can be implemented in numerous ways, such as with dedicated hardware, or with general-purpose hardware (e.g., a single processor, multiple processors or graphics processing units capable of parallel computations, or others) that is programmed using microcode or software instructions to perform the functions recited herein. The system architecture further includes a memory 350 for storing necessary data in execution, such as variables, data tables or others, and a storage device 340 for storing a wide range of electronic files. A communications interface 360 is included in the system architecture and the processing unit 310 can thereby communicate with other wireless apparatuses. The communications interface 360 may be a Bluetooth module with a low-cost and a low-battery-power-consumption.

Figure 4:
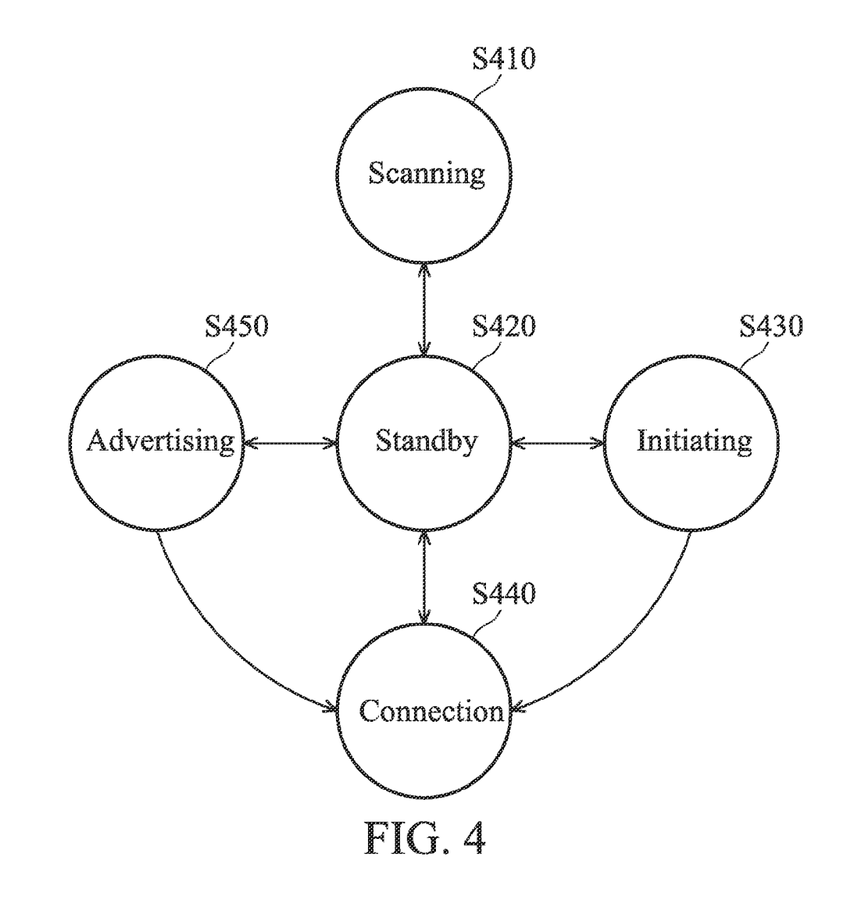
FIG. 4 is a schematic diagram of a state machine in a link layer according to an embodiment of the invention.

In deployment, the Bluetooth nodes 131 to 136 are configured as master nodes while the mobile apparatus 150 is configured as a slave node. Each of the Bluetooth nodes 131 to 136 and the mobile apparatus 150 practices a state machine in a link layer so as to manage message exchanges between the link layers of one of the Bluetooth nodes 131 to 136 and the mobile apparatus 150 and perform relevant processes corresponding to a received message. FIG. 4 is a schematic diagram of a state machine in a link layer according to an embodiment of the invention. When powering on and activating the Bluetooth module, the Bluetooth nodes 131 to 136 and the mobile apparatus 150 enter the standby state S420 initially. Subsequently, the mobile apparatus 150 periodically enters the advertising state S450 from the standby state S420 for broadcasting advertising messages and each of the Bluetooth nodes 131 to 136 periodically enters the scanning state S410 from the standby state S420 for scanning a specific frequency band and determining whether any advertising message is broadcast by a node. Regularly, when detecting an advertising message broadcast by the mobile apparatus 150, any of the Bluetooth nodes 131 to 136 enters the initiating state S430 for sending a connection request to the mobile apparatus 150. When the mobile apparatus 150 accepts the connection request from any of the Bluetooth nodes 131 to 136, both of the mobile apparatus 150 and the requesting Bluetooth node enter the connection state S440.

Figure 5:
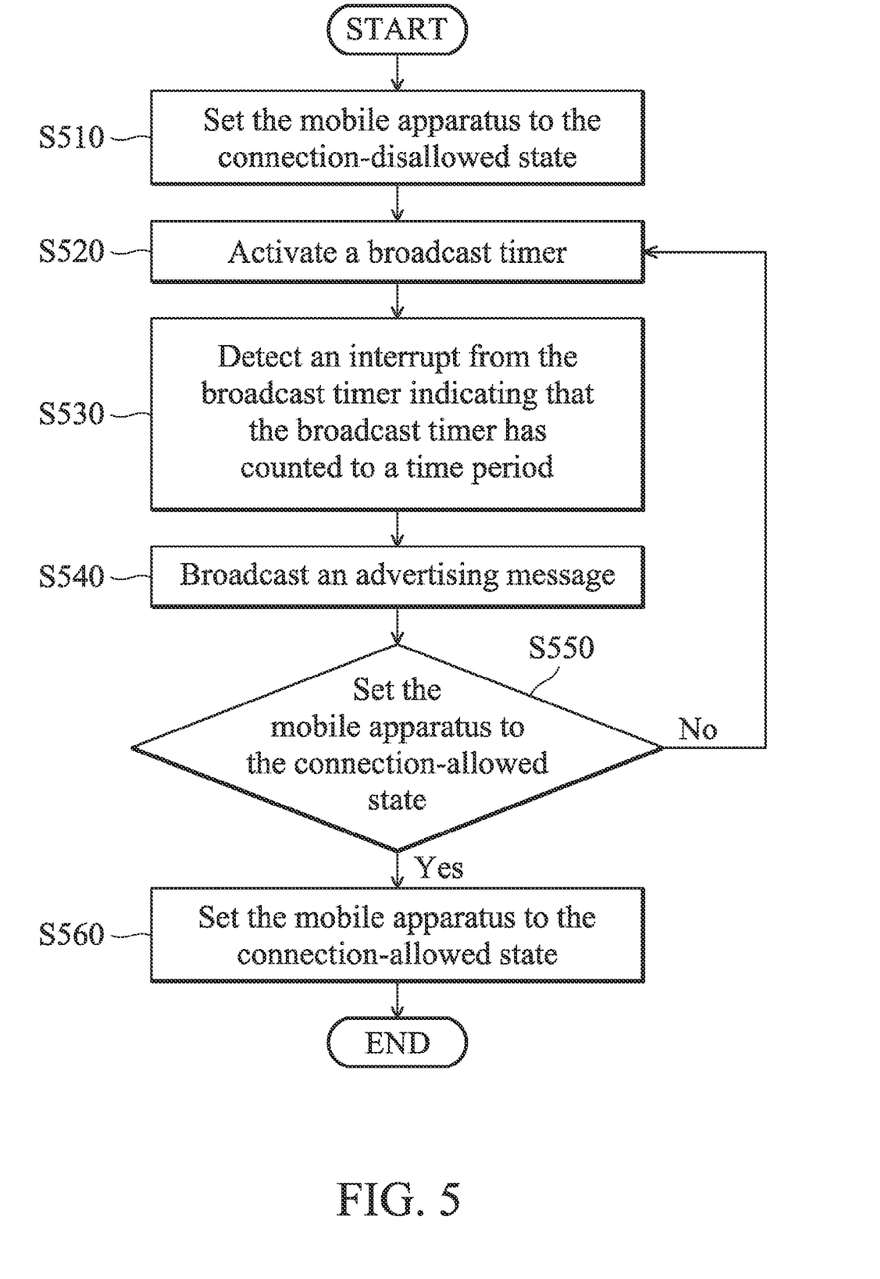
FIG. 5 is a flowchart illustrating a method for an indoor positioning, performed by a processing unit of a mobile apparatus, according to an embodiment of the invention.

When activating an indoor positioning, the mobile apparatus 150 is set to the connection-disallowed state for disabling the functionality for connecting to any Bluetooth node. Once connecting to any Bluetooth node, the mobile apparatus 150 spends excessive time to perform state transitions and message exchanges so as to hinder the broadcasting of advertising messages. If it is the case, the mobile apparatus 150 cannot be located more frequently. FIG. 5 is a flowchart illustrating a method for an indoor positioning, performed by the processing unit 210 of the mobile apparatus 150, according to an embodiment of the invention. The method broadcasts advertising messages to Bluetooth nodes periodically. Firstly, when the indoor positioning is activated, the mobile apparatus 150 is set to the connection-disallowed state (step S510). In step S510, a user may perform the setting via an MMI (Man-machine interface) provided by the mobile apparatus 150. Next, a broadcast timer is activated, thereby enabling the broadcast timer to issue an interrupt to processing unit 210 after a time period has elapsed (step S520). A loop (steps S530 to S550) is periodically performed for broadcasting advertising messages. Specifically, After detecting an interrupt from the broadcast timer indicating that the broadcast timer has counted to a time period (such as one second) (step S530), the processing unit 210 enters the advertising state S450 for broadcasting an advertising message (step S540) and determines whether the indoor positioning is deactivated (step S550). It should be noted that, when the advertising state S450 is entered, the mobile apparatus 150 is considered as an advertiser. If so, the mobile apparatus 150 is set to the connection-allowed state (step S560) and ends the process. Otherwise, the mobile apparatus 150 goes back to the standby state S420 and the processing unit 210 resets the broadcast timer (step S520). In step S540, the processing unit 210 may broadcast an advertising message with an iBeacon packet via the communications interface 260. Because the mobile apparatus 150 is set to the connection-disallowed state, the processing unit 210 sets a PDU (Packet Data Unit) type of a header of an iBeacon packet to "ADV_SCAN_IND", thereby enabling any of the Bluetooth nodes 131 to 136 not to send a connection request to the mobile apparatus 150 when detecting the iBeacon packet. It should be noted that, in order to prevent any of the Bluetooth nodes 131 to 136 from attempting to establish a connection with the mobile apparatus 150, the processing unit 210 does not set a PDU type of a header of an iBeacon packet to "ADV_IND". The processing unit 210 may encapsulate information into a PDU body in the following Table 1:

TABLE 1

| Length (Bytes) | Type | Data | Description |
| --- | --- | --- | --- |
| 7 | 0xFF | Company ID + Timestamp | Product Identity (2 Bytes) Timestamp (4 Bytes) |
| 5 | 0x09 | User ID | User Identity (4 Bytes) |
| 2 | 0x08 | User Status | Application Identity (1 Byte) |
| 2 | 0x0A | Tx Power | Transmission Power (1 Byte) |

The processing unit 210 may store a timestamp at which an advertising message is sent in the "Timestamp" field, the identity of the mobile apparatus 150 in the "User ID" field, the transmission power for broadcasting the advertising message in the "Tx Power" field, and relevant information required by applications, such as heart rate, blood pressure, body temperature, or a similar health information, in the "User Status" field.

Figure 6:
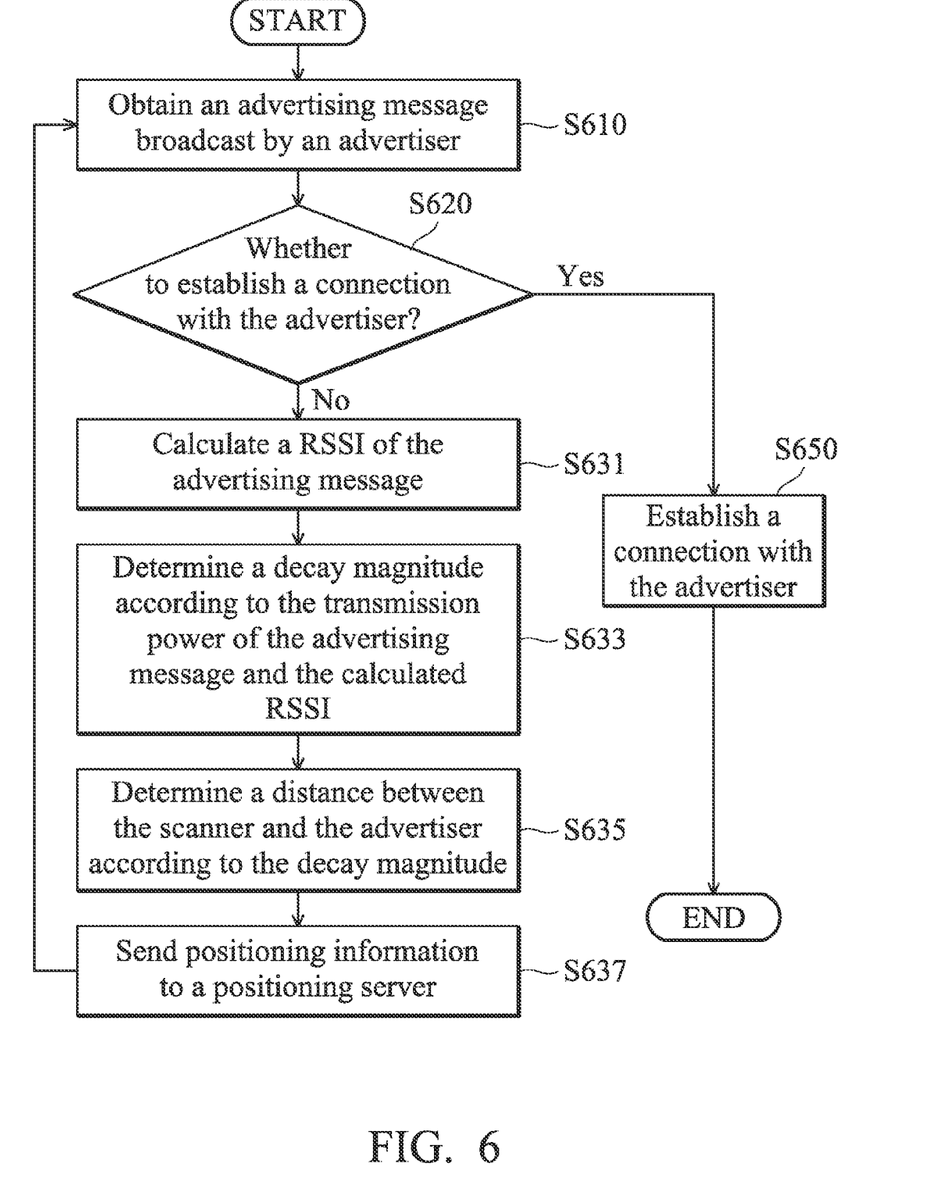
FIG. 6 is a flowchart illustrating a method for an indoor positioning, performed by a processing unit 310 of a Bluetooth node, according to an embodiment of the invention.

FIG. 6 is a flowchart illustrating a method for an indoor positioning, performed by the processing unit 310 of any of the Bluetooth nodes 131 to 136, according to an embodiment of the invention. It should be noted that, when the scanning state S410 is entered, the Bluetooth node is considered as a scanner. After obtaining an advertising message broadcast by an advertiser (for example, the mobile apparatus 150) (step S610), the processing unit 310 determines whether to establish a connection with the advertiser (step S620). In step S620, the processing unit 310 may determine whether the PDU type of the header of the iBeacon packet is "ADV_SCAN_IND" or "ADV_IND". If the PDU type of the header of the iBeacon packet is set to "ADV_IND", then it is determined that the scanner needs to establish a connection with the advertiser. If the PDU type of the header of the iBeacon packet is set to "ADV_SCAN_IND", then it is determined that the scanner does not need to establish a connection with the advertiser. If the scanner needs to establish a connection with the advertiser (the "Yes" path of step S620), then the processing unit 310 establish a connection with the advertiser by a specific protocol via the communications interface 360 (step S650). If the scanner does not need to establish a connection with the advertiser (the "No" path of step S620), then the processing unit 310 calculates a RSSI (Received Signal Strength Indicator) of the advertising message (step S631), determines a decay magnitude according to the transmission power of the advertising message and the calculated RSSI (step S633), determines a distance between the scanner and the advertiser according to the decay magnitude, where a greater decay magnitude indicates a farther distance (step S635) and sends positioning information, such as the three-dimensional location of the scanner, the identity of the advertiser, the timestamp of the advertising message and the calculated distance, to the positioning server 170 through another Bluetooth node(s), LAN, Internet or any combinations thereof via the communications interface 360 (step S637).

Although the embodiment has been described as having specific elements in FIGS. 2 and 3, it is noted that additional elements may be included to achieve better performance without departing from the spirit of the invention. While the process flows described in FIGS. 5 and 6 each includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for indoor positioning, comprising:
    a communications interface; and
    a processing unit, coupled to the communications interface, setting the apparatus to a connection-disallowed state when an indoor positioning is activated for disabling functionality for connecting to any Bluetooth node; and broadcasting an advertising message periodically in an advertising state via the communications interface,
    wherein the advertising message comprises an identity of the apparatus, a timestamp at which the advertising message is sent, and a transmission power.

2. The apparatus of claim 1, wherein the advertising message is broadcast by an iBeacon packet.

3. The apparatus of claim 1, wherein the processing unit determines whether the indoor positioning is deactivated; and sets the apparatus to a connection-allowed state when the indoor positioning is deactivated.

4. The apparatus of claim 3, wherein the advertising message is broadcast by an iBeacon packet, and the processing unit sets a PDU (Packet Data Unit) type of a header of the iBeacon packet to "ADV_SCAN_IND" when the apparatus is set to the connection-disallowed state.

5. The apparatus of claim 1, wherein the apparatus is configured as a slave node.

6. An apparatus for indoor positioning, comprising:
    a communications interface; and
    a processing unit, coupled to the communications interface, obtaining a transmission power of an advertising message from an advertiser in a scanning state via the communications interface; calculating a reception strength for receiving the advertising message; calculating a decay magnitude according to the transmission power and the reception strength; determining a distance between the apparatus and the advertiser according to the decay magnitude; and sending positioning information corresponding to the advertiser to a positioning server, wherein the positioning information comprises a first location of the apparatus, an identity of the advertiser, a timestamp at which the advertising message is sent, and the distance, thereby enabling the positioning server to calculate a second location of the advertiser according to the positioning information.

7. The apparatus of claim 6, wherein the processing unit determines whether to establish a connection with the advertiser; and calculates the reception strength for the advertising message when the apparatus does not need to establish a connection with the advertiser.

8. The apparatus of claim 7, wherein the advertising message is broadcast by an iBeacon packet.

9. The apparatus of claim 8, wherein the processing unit determines that the apparatus does not need to establish a connection with the advertiser when a PDU (Packet Data Unit) type of a header of the iBeacon packet is set to "ADV_SCAN_IND".

10. The apparatus of claim 9, wherein the apparatus is configured as a master node and the advertiser is configured as a slave node.

11. A method for indoor positioning, executed by a processing unit of an advertiser, comprising:
setting the advertiser to a connection-disallowed state when an indoor positioning is activated for disabling functionality for connecting to any Bluetooth node;
broadcasting an advertising message periodically in an advertising state, wherein the advertising message comprises an identity of the advertiser, a timestamp at which the advertising message is sent, and a transmission power.

12. The method of claim 11, wherein the advertising message is broadcast by an iBeacon packet.

13. The method of claim 11, further comprising:
determining whether the indoor positioning is deactivated; and
setting the advertiser to a connection-allowed state when the indoor positioning is deactivated.

14. The method of claim 13, wherein the advertising message is broadcast by an iBeacon packet, the method further comprising:
setting a PDU (Packet Data Unit) type of a header of the iBeacon packet to "ADV_SCAN_IND" when the advertiser is set to the connection-disallowed state.

15. The method of claim 11, wherein the advertiser is configured as a slave node.

16. A method for indoor positioning, executed by a processing unit of a scanner, comprising:
obtaining a transmission power of an advertising message from an advertiser in a scanning state;
calculating a reception strength for receiving the advertising message;
calculating a decay magnitude according to the transmission power and the reception strength;
determining a distance between the scanner and the advertiser according to the decay magnitude; and
sending positioning information corresponding to the advertiser to a positioning server, wherein the positioning information comprises a first location of the scanner, an identity of the advertiser, a timestamp at which the advertising message is sent, and the distance, thereby enabling the positioning server to calculate a second location of the advertiser according to the positioning information.

17. The method of claim 16, further comprising:
determining whether to establish a connection with the advertiser; and
calculating the reception strength for the advertising message when the scanner does not need to establish a connection with the advertiser.

18. The method of claim 17, wherein the advertising message is broadcast by an iBeacon packet.

19. The method of claim 18, further comprising:
determining that the scanner does not need to establish a connection with the advertiser when a PDU (Packet Data Unit) type of a header of the iBeacon packet is set to "ADV_SCAN_IND".

20. The method of claim 19, wherein the scanner is configured as a master node and the advertiser is configured as a slave node.

* * * * *